United States Patent [19]
Diemer et al.

[11] Patent Number: 5,269,923
[45] Date of Patent: Dec. 14, 1993

[54] AGITATOR SUCTION FILTER

[75] Inventors: Wolfgang Diemer, Waldstetten; Dieter Krieg, Bartholomae, both of Fed. Rep. of Germany

[73] Assignee: Schenk Filterbau GmbH, Waldsteten, Fed. Rep. of Germany

[21] Appl. No.: 857,014

[22] Filed: Mar. 24, 1992

[30] Foreign Application Priority Data

Feb. 27, 1991 [DE] Fed. Rep. of Germany ....... 4106094

[51] Int. Cl.⁵ ............................................. B01D 25/32
[52] U.S. Cl. .................................... 210/413; 210/415
[58] Field of Search ................ 210/408, 413, 414, 415

[56] References Cited

U.S. PATENT DOCUMENTS

| | | | |
|---|---|---|---|
| 3,441,141 | 4/1969 | Zimmermann et al. | 210/408 |
| 3,743,539 | 7/1973 | Kroyer et al. | 127/16 |
| 4,081,381 | 3/1978 | Rosenmund et al. | 210/408 |
| 4,376,705 | 3/1983 | Komura et al. | 210/413 |
| 4,399,042 | 8/1983 | Stannard et al. | 210/408 |
| 4,417,980 | 11/1983 | Baur et al. | 210/91 |
| 4,592,835 | 6/1986 | Grieder et al. | 210/413 |
| 4,828,697 | 5/1989 | Kuhnt et al. | 210/408 |
| 4,888,111 | 12/1989 | Diemer | 210/413 |
| 5,087,365 | 2/1992 | Davis et al. | 210/415 |

FOREIGN PATENT DOCUMENTS 3533038 9/1985 Fed. Rep. of Germany .

Primary Examiner—Peter Hruskoci
Assistant Examiner—Robert James Popovics
Attorney, Agent, or Firm—Jenner & Block

[57] ABSTRACT

An agitator suction filter for the filtration of fluids containing solids, is provided with a housing with an inlet opening, a bottom cover, a filter plate lying over the bottom cover, with an agitator arranged to rotate over the filter plate, this agitator being provided with an hydraulic lifting and lowering device and with extraction elements which carry or transport the filter cake to an outlet opening, and with an outlet opening and an outlet line which is provided with a shut-off device. Around the agitator shaft is arranged a drive bush which is connected at the external periphery via a drive element to the drive motor and at the internal periphery fixed against rotation to the agitator shaft, with the drive bush being led through a sealing unit and the agitator shaft mounted by the drive bush and movable axially via the lifting and lowering device.

20 Claims, 2 Drawing Sheets

AGITATOR SUCTION FILTER

The invention relates to an agitator suction filter for the filtration of fluids containing solids, with a housing with an inlet opening, a bottom cover, a filter plate lying over the bottom cover, with an agitator arranged to rotate over the filter plate, this agitator being provided with an hydraulic lifting and lowering device and with extraction elements which carry or transport the filter cake to an outlet opening, and with an outlet opening and an outlet line which is provided with a shut-off device.

BACKGROUND OF THE INVENTION

A suction filter of this type is described in German Patent No. DE-PS 35 33 038. A cage is placed on the housing, through which the agitator shaft is led and on which the drive motor is placed. For the vertical adjustment of the agitator shaft two lateral piston rods are provided, which are connected to each other by means of a main cross beam. In turn, two hydraulic cylinders projecting vertically upward are arranged on the main cross beam itself. The piston rods of these hydraulic cylinders are connected to each other by means of a cross beam.

A disadvantage of this embodiment is, however, that such an agitator suction filter has a relatively large overall height.

SUMMARY OF THE INVENTION

The object of the present invention is based on a further development of the agitator suction filter mentioned at the beginning or a process filter, and in such a way that the overall height is reduced, at the same time achieving a simple design.

In accordance with a preferred embodiment of the invention, this problem is solved by providing a drive bush arranged around the agitator shaft, which is connected at the outer periphery via a drive element to the drive motor and at the inner periphery non-rotatably to the agitator shaft, with the drive bush being led through a sealing unit and the agitator shaft mounted by the drive bush and axially movable via the lifting and lowering device.

This arrangement reduces in the overall height of the entire means, because the seal opposite the housing can be integrated into the drive bush. This means that, in contrast to the prior art, the seal does not increase the overall height.

In one embodiment, the outlet opening is located in the central area of the axis of the housing and a vertically adjustable and rotatable drilling device is disposed in the interior of the agitator shaft driven by a drive motor. Provision can be made for the hydraulic lifting and lowering unit to have a centrally arranged lifting cylinder having two independently actuatable adjusting elements for the agitator shaft and the drill shaft.

Through the centrally arranged lifting cylinder with the two adjusting elements it is possible to perform, with a great saving of space, both lifting movements, i.e. on the one hand for the agitator shaft and on the other for the drill shaft. Both lifting movements are thus integrated in a compact unit and so inserted into one another that the two lifting lengths do not add. This means a reduction in overall height by one complete lifting height. The lifting height of the agitator shaft and of the drilling device depends on the height of the filter cake created in the interior of the housing during filtration.

A further advantage of the embodiment according to the invention is improved safety. Due to the integrated mode of construction with the lifting cylinder, the rotating movements and the lifting movements no longer act freely outwards, but a compact, closed unit can be formed in an easy way.

Due to the ommission of a special lifting bearing and at least of a cross beam or yoke and several hydraulic cylinders, in addition to a reduction in the overall height, a reduction of cost and a simpler and easier installation is possible.

Through this embodiment a reduction in overall height is also achieved.

In a simple way the drive bush can be driven by a spur gear which, for example, is arranged at the periphery of a flange connected to the drive bush and connected to a stationary inner bearing ring.

Through this embodiment all radial and axial forces and moments or torques occurring can be absorbed. At the same time the torque of the drive means is led via the spur gear into the drive bush and from there transmitted to the agitator shaft located in the center. This can, for example, take place via a driving connection such as a feather key or a multiple-spline connection.

On the embodiment according to the invention the total length of the drive bush is thus designed for the axial lifting movement of the central agitator shaft, including the torque driving connection. This means that the forces and moments (torques) acting on the agitator shaft are taken up mostly by the drive bush, and the agitator shaft an therefore be dimensioned to be smaller and thus less expensive in comparison with the prior art.

The fact that the drive bush, which is also simultaneously precisely mounted in the spur gear, is guided through the sealing unit, an additional mounting in the sealing unit can be omitted.

This results not only in a price advantage but also improved accessibility, less wear and simpler maintenance.

In a simple way the spur gear is connected to a pinion arranged on a gear unit output shaft. The gear unit can be arranged laterally together with the drive motor on a bearing pedestal placed on the housing.

Through the lateral arrangement of the gear unit and of the drive motor, a reduction in overall height is achieved.

A further, very advantageous feature of the invention may also consist in that folding bellows are pushed over the drive bush and the agitator shaft. One end of the bellows is fastened to the periphery of the drive bush and the other to the bottom end of the agitator shaft or to the hub of the agitating element.

The installation of folding bellows as protection for the agitator shaft for the sealing of the axial lifting movement of the agitator shaft influenced the overall height unfavourably in the designs according to the prior art. In addition to an optimum sealing of the lifting movement without dragging seal, with the design according to the invention the installation of a bellows no longer increases the overall height because it only surrounds the part of the drive bush projecting into the interior of the tank.

In a simple way the lifting cylinder can be fastened to a portal-like structure, with supply and discharge pipes for liquids and gases also being able to be introduced, which lead from there into the interior of the agitator.

In an alternative embodiment, the open portal-like structure is replaced by a a bell-shaped housing which is placed on the casing or a part connected to it, such as the bearing pedestal. The lifting cylinder and the parts connected to it are arranged in the interior of the bell-shaped housing.

In this way a fully closed assembly unit is obtained, avoiding the danger of damage, injury and contamination.

The lifting cylinder can be designed so that the two independently actuatable adjusting elements have an inner piston for the vertical adjustment of the drill shaft and an annular piston arranged around the inner piston for the stroke of the agitator shaft.

Below is a more detailed description of the principles of an embodiment of the invention on the basis of the drawing.

DETAILED DESCRIPTION OF THE DRAWINGS

Basically the agitator suction filter is of the known type (with and without drilling means), which is why in the following only the parts significant to the invention are described in further detail.

Figure 1:
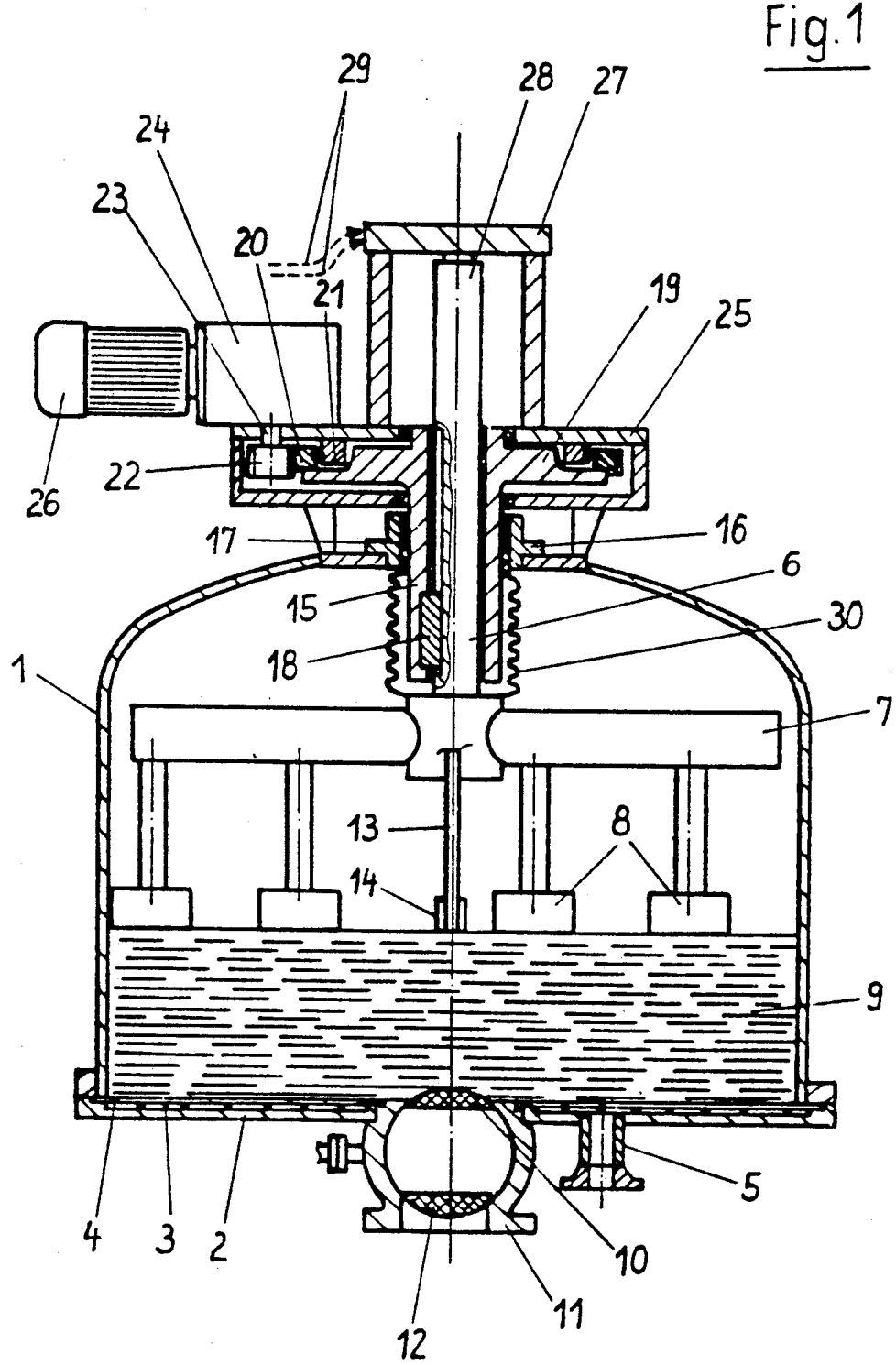
FIG. 1 shows a longitudinal section through an agitator suction filter according to the invention with a drilling device.

The preferred embodiment of the invention is illustrated in FIGS. 1 and 1. The preferred embodiment has a rotation-symmetrical housing 1 with a bottom cover 2 which is connected in any desired way to the housing. Above the bottom cover 2 a filter plate 4 lies on spacer elements 3. Via an inlet (not shown) the liquid to be treated is brought into the interior of the housing. Filtered-out or pressed-out liquid leaves the housing via an outlet 4 underneath the filter plate 5.

Coaxially to the longitudinal axis of the housing 1 lies an agitator shaft 6 with an agitator 7 at its bottom end, on which spade-like extracting elements 8 are arranged. The spade-like extracting elements 8 ensure, depending on the direction of rotation, either a smoothing of the filter cake 9 or its transport to a central opening 10 in the bottom cover 2. The central opening 10, to which is connected an outlet pipe 11, can be closed by a shut-off means 12. In FIG. 1 the shut-off device 12 is shown in shut-off position. By a turn through 90° the extraction position is reached.

For the extraction of the filter cake a drilling means consisting essentially of a drill shaft 13 with a drilling head 14 at its bottom end is pushed from above rotating through the filter cake, with which a hole with a corresponding diameter is drilled. The drill shaft is led through a central cavity in the interior of the agitator shaft 6.

The agitator shaft 6 is led through a drive bush 15, which is arranged in the upper side of the housing 1 and which partially projects into the interior of housing.

A seal 17 is arranged between a flange ring 16 placed on the top of the housing 1 and the external peripheral wall of the drive bush 15. The agitator shaft 6 is led through the drive bush 15 into its interior, with a feather key 18 between both parts ensuring a rotary connection.

At the top end the drive bush 15 is provided with a flange 19, which may be single-piece with the drive bush 15. To the outer peripheral wall of the flange 19 a spur gear 20 is fastened, which is provided with an internal integrated bearing 21. Spur gears of this type with an integrated bearing or an internal, fixed bearing ring are generally well known.

The spur gear 20 meshes with a pinion 22, which is arranged on the output shaft 23 of a gear unit 24. The gear unit 24 is placed laterally on a bearing pedestal, which in turn rests on the top of the housing 1. A drive motor 26 is flange-mounted laterally outwards on the gear unit 24.

On a portal-like structure 27 a lifting cylinder 28 is fastened centrally, whose longitudinal axis lies coaxially to the longitudinal axis of the housing 1.

The stroke cylinder 28 is designed as a special cylinder with two pistons, namely an inner piston 31, which serves for the vertical adjustment of the drill shaft 13, which is connected accordingly to the inner piston 31, and an annular piston 32 arranged around the inner piston 31, for the stroke of the agitator shaft 6. Further details on this can be taken from FIG. 2. As can be seen, cylinder 28 has a fixed housing which is firmly connected at its upper end to a bell-shaped housing 27A. The bell-shaped housing 27 A represents an alternative solution to the portal-like structure 27 and is with its underside on the bearing pedestal 25.

The piston rod 31A of the piston 31 is arranged in the interior of the cylinder housing 33. In the known way the piston spaces on both sides of the piston 31 are provided with a pressure means, generally hydraulic oil, via delivery pipes 34 and 35.

In the same way the annular piston 32 is arranged on the outside around the cylinder housing 33. At the top end a seal 38 ensures sealing of a piston space 40 between the annular piston 32 and the cylinder housing 33. A bottom flange 39 with seals between the lower end face of the annular piston 32 and the external circumferential wall of the cylinder housing 33 separates the aforementioned upper piston space from the lower piston space 41. Via a delivery pipe 36 the bottom piston space, and via a delivery pipe 37, the top piston space are supplied with pressure agent. The annular piston 32 is connected outside firmly to the agitator shaft 6. The flange 39 is single-piece with the cylinder housing 33.

Figure 2:
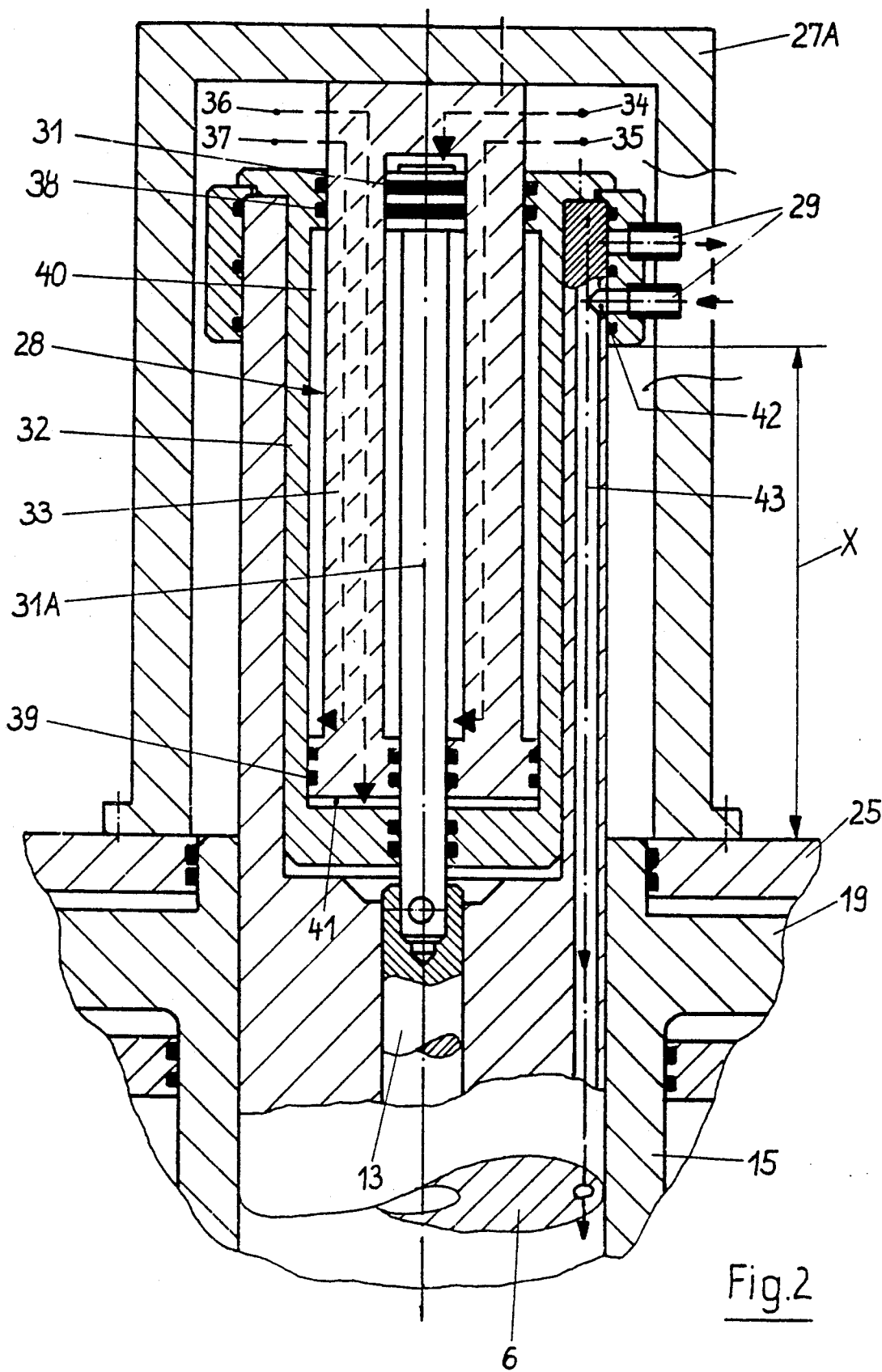
FIG. 2 shows an extract enlargement in section with the lifting cylinder.

In FIG. 2 the delivery pipes 34, 35, 36 and 37 are indicated only in broken lines. Through an opening in the bell-shaped housing 27A are introduced the supply and discharge pipes 29 for the agitator shaft 6, which are forwarded in the usual way via annular grooves 42 and axial channels 43. Via the axial channels a cooling or heating of the agitating elements can, for example, take place. Likewise, in this way liquids or gases can be introduced also into the interior of the housing itself for any processes.

By corresponding introductions of pressure medium into the piston spaces through the delivery pipes 34,35,36 and 37, the lifting and lowering movements for the drill shaft 13 and the lifting movement for the agitator shaft 6 can be performed independently of each other. For example, the drill shaft 13 moves downwards on the addition of pressure medium through the delivery pipe 34, whereby it likewise rotates simultaneously due to the connection to the rotating flange 19. In this way the filter cake 9 can penetrate with the drilling head 14, so that an extraction through the outlet pipe 11 is made possible. Subsequently, the drill shaft 13 travels, through a pressurization of the other piston space, via a pressure-agent supply pipe through the delivery pipe 35 upwards again. Following this—as the case may be undere reversal of the direction of rotation—the agitator shaft 6 is moved downwards by an addition of pressure agent into the piston space 41 via the delivery pipe 26, with the spade-like extracting elements 8 peeling off the filter cake and carrying it to the center of housing so that it can be extracted through the outlet pipe 11. When the agitator shaft 6 has reached its lowest position, with the extracting elements 8 located immediately above the filter plate 5 and thus the filter cake has been completely removed and discharged, the agitator shaft 6 is again pulled back upwards through the introduction of a pressure medium into the piston space 40 via the delivery pipe 37 into the initial position (see FIG. 1). In this way the agitator suction filter is available for a new filtering operation.

In the interior of housing 1 the drive bush 15 and the agitator shaft 6 are surrounded by bellows 30. The bottom end of the bellows 30 is fastened to the hub of the agitator 7, whereas its top end is fastened to the drive bush 15. In this way the agitator shaft 6 is always protected during lifting movements.

The overall height advantage of the agitator suction filter is based essentially on two reasons. On the one hand the otherwise lost intermediate space between the sealing unit and the drive gear unit block is not necessary, and on the other the gear unit height and the shaft seal height no longer enter into the summing-up for the total height of the apparatus because these two units are no longer arranged one after the other, but surround the drive bush 15. Unlike the well-known designs, the transmission of torque, which in the present case takes place through the feather key 18, also no longer negatively affects the overall height, since its axial length does not have to be taken into consideration in the adjusting path or the lifting movement of the agitator shaft 6.

In the previous known designs the lifting height was contained at least five or six times in the overall height of the device. For this purpose the components arranged one after the other, such as gear unit height and shaft seal height, also had to be taken into consideration, as they added up. These movements are integrated in the stroke X (see FIG. 2) of the agitator shaft 6.

As an embodiment of the invention, an agitator suction filter with a central outlet opening and a drilling means for the outlet opening and the outlet pipe has been described. It goes without saying, however, that within the framework of the invention an embodiment is also possible in which a drilling means is lacking and, where required, the outlet opening is arranged laterally. The advantages of the reduction in overall height through the arrangement of the drive bush around the agitator shaft, and the type of seal, also lead, in a process filter, as this type is called, in any case in comparison with the solutions according to the prior art, likewise to a distinct reduction in overall height. A process filter of this type is described, for example, in German patent No. DE-PS 30 22 658.

We claim:

1. An agitator suction filter for the filtration of fluids containing solids having a housing with an inlet opening, a bottom cover, a filter plate lying over the bottom cover for retaining a filter cake, and an outlet opening through said bottom cover, comprising:

an agitator having a shaft and arranged to rotate over the filter plate, said agitator having extraction elements for carrying the filter cake toward said outlet opening;

means for hydraulically lifting and lowering said agitator relative to the filter cake;

a drive bush having a lower portion within said housing; and drive means for rotatably driving said drive bush;

wherein said drive bush has an inner and an outer peripheral wall, said inner peripheral wall being fixed in driving connection to said agitator shaft, said drive bush including an integrated bearing, an annular flange connected to said integrated bearing and a spur gear engageable with said drive means, said spur gear being located at a periphery of said annular flange;

wherein said drive means is engaged with said outer peripheral wall of said drive bush for rotating said drive bush; and wherein said agitator shaft is supported by said drive bush and is constructed and arranged for vertical movement within said drive bush by said lifting and lowering means.

2. An agitator suction filter according to claim 1 further comprising a drill having a drill shaft in vertical alignment with the outlet opening, and wherein:

said agitator shaft includes a cavity for receiving said drill shaft, said drill shaft being disposed in said cavity for vertical movement therein;

said hydraulic lifting and lowering means comprises a centrally arranged lifting cylinder which has a first and second independently actuatable elements for vertically adjusting said agitator shaft and said drill shaft, respectively, relative to the filter cake.

3. An agitator suction filter according to claim 2, further comprising a portal-shaped structure in which said lifting cylinder is located.

4. An agitator suction filter according to claim 3, further comprising discharge pipes for providing a channel for the passage of fluids between the interior and exterior of the housing.

5. An agitator suction filter according to claim 2, further comprising a bell-shaped housing in which said lifting cylinder is located.

6. An agitator suction filter according to claim 2, wherein said first actuatable element is an inner piston and said second actuatable element is an annular piston arranged around said inner piston.

7. An agitator suction filter according to claim 1 wherein said drive means comprises a drive motor and a pinion for engagement with said spur gear.

8. An agitator suction filter according to claim 7, further comprising a bearing pedestal placed on the housing, wherein said drive motor and said pinion are arranged laterally on said pedestal.

9. An agitator suction filter according to claim 1, wherein a feather key fixes said inner peripheral wall of said drive bush in driving connection to said agitator shaft.

10. An agitator suction filter according to claim 1 further comprising folding bellows having first and second ends, wherein said first end of said bellows is fastened to said outer peripheral wall of said drive bush, and said second end is fastened to the bottom end of said agitator shaft.

11. An agitator suction filter according to claim 1, wherein said hydraulic lifting and lowering means comprises a centrally arranged lifting cylinder for vertically adjusting said agitator shaft.

12. An agitator suction filter according to claim 11, further comprising a bell-shaped housing in which said lifting cylinder is located.

13. An agitator suction filter for the filtration of fluids containing solids having a housing with an inlet opening, a bottom cover, a filter plate lying over the bottom cover for retaining a filter cake and an outlet opening through said bottom cover, comprising:

an agitator having a shaft and arranged to rotate over the filter plate, said agitator having extraction elements for carrying the filter cake toward said outlet opening;

means for hydraulically lifting and lowering said agitator relative to the filter cake;

a drive bush; and drive means for rotatably driving said drive bush;

wherein said drive bush has an inner and an outer peripheral wall, said inner peripheral wall being fixed in driving connection to said agitator shaft, said drive bush including an integrated bearing, an annular flange connected to said integrated bearing and a spur gear engageable with said drive means, said spur gear being located at a periphery of said annular flange;

wherein said drive means is engaged with said outer peripheral wall of said drive bush for rotating said drive bush; and wherein said agitator shaft is supported by said drive bush and is adapted for vertical movement within said drive bush by said lifting and lowering means.

14. An agitator suction filter according to claim 3 further comprising a drill having a drill shaft in vertical alignment with the outlet opening, and wherein:

said agitator shaft includes a cavity for receiving said drill shaft, said drill shaft being disposed in said cavity for vertical movement therein;

said hydraulic lifting and lowering means comprises a centrally arranged lifting cylinder which has a first and second independently actuatable elements for vertically adjusting said agitator shaft and said drill shaft, respectively, relative to the filter cake.

15. An agitator suction filter according to claim 14, wherein said first actuatable element is an inner piston and said second actuatable element is an annular piston arranged around said inner piston.

16. An agitator suction filter for the filtration of fluids containing solids having a housing with an inlet opening, a bottom cover, a filter plate lying over the bottom cover for retaining a filter cake and an outlet opening through said bottom cover, comprising:

an agitator having a shaft and arranged to rotate over the filter plate, said agitator having extraction elements for carrying the filter cake toward said outlet opening;

means for hydraulically lifting and lowering said agitator relative to the filter cake;

a drive bush having a lower portion engaging a feather key within said housing; and drive means for rotatably driving said drive bush;

wherein said drive bush has an inner and an outer peripheral wall, said inner peripheral wall being fixed in driving connection to said agitator shaft via said feather key;

wherein said drive means is engaged with said outer peripheral wall of said drive bush for rotating said drive bush; and wherein said agitator shaft is supported by said drive bush and is adapted for vertical movement within said drive bush by said lifting and lowering means.

17. An agitator suction filter according to claim 16 further comprising a drill having a drill shaft in vertical alignment with the outlet opening, and wherein:

said agitator shaft includes a cavity for receiving said drill shaft, said drill shaft being disposed in said cavity for vertical movement therein;

said hydraulic lifting and lowering means comprises a centrally arranged lifting cylinder which has a first and second independently actuatable elements for vertically adjusting said agitator shaft and said drill shaft, respectively, relative to the filter cake.

18. An agitator suction filter according to claim 17, wherein said first actuatable element is an inner piston and said second actuatable element is an annular piston arranged around said inner piston.

19. An agitator suction filter for the filtration of fluids containing solids having a housing with an inlet opening, a bottom cover, a filter plate lying over the bottom cover for retaining a filter cake and an outlet opening through said bottom cover, comprising:

an agitator having a shaft and arranged to rotate over the filter plate, said agitator having extraction elements for carrying the filter cake toward said outlet opening;

a drill having a drill shaft in vertical alignment with the outlet opening, said agitator shaft including a cavity for receiving said drill shaft, said drill shaft being disposed in said cavity for vertical movement therein;

means for hydraulically lifting and lowering said agitator shaft and said drill shaft relative to the filter cake;

said hydraulic lifting and lowering means comprising a centrally arranged lifting cylinder which has first and second independently actuatable elements for vertically adjusting said agitator shaft and said drill shaft, respectively, relative to the filter cake;

a drive shaft bush; and drive means for rotatably driving said drive bush;

wherein said drive bush has an inner and an outer peripheral wall, said inner peripheral wall being fixed in driving connection to said agitator shaft;

wherein said drive means is engaged with said outer peripheral wall of said drive bush for rotating said drive bush; and wherein said agitator shaft is supported by said drive bush and is adapted for vertical movement within said drive bush by said lifting and lowering means.

20. An agitator suction filter according to claim 19, wherein said first actuatable element is an inner piston and said second actuatable element is an annular piston arranged around said inner piston.

* * * * *

UNITED STATES PATENT AND TRADEMARK OFFICE
CERTIFICATE OF CORRECTION

PATENT NO. : 5,269,923

DATED : December 14, 1993

INVENTOR(S) : Wolfgang Diemer and Dieter Krieg

It is certified that error appears in the above-identified patent and that said Letters Patent is hereby corrected as shown below:

Title page, item [73], change "Waldsteten" to --Waldstetten--

Col. 1, line 47, after "arrangement" insert --significantly--; and line 53, before "axis" insert --longitudinal--.

Col. 2, line 34, after "shaft" delete "an" and insert therefor --can--.

Col. 3, line 4, delete "a" (first occurrence);

line 35, delete "1" (second occurrence) and insert therefor --2--; and line 42, after "outlet" delete "4" and insert therefor --5--; and after "plate" delete "5" and insert therefor --4--.

Col. 4, line 27, after "is" insert --placed--.

Col. 7, line 31, delete "3" and insert therefor --13--.

UNITED STATES PATENT AND TRADEMARK OFFICE
CERTIFICATE OF CORRECTION

PATENT NO. : 5,269,923
DATED : December 14, 1993
INVENTOR(S) : Wolfgang Diemer, et. al.

It is certified that error appears in the above-indentified patent and that said Letters Patent is hereby corrected as shown below:

Col. 8, line 46, after "drive" delete "shaft"--.

Signed and Sealed this

Twenty-sixth Day of April, 1994

Attest:

BRUCE LEHMAN

*Attesting Officer*  *Commissioner of Patents and Trademarks*